June 16, 1931.   G. A. BRAGG   1,809,818
GAS PURIFICATION PROCESS AND APPARATUS
Filed Dec. 31, 1927
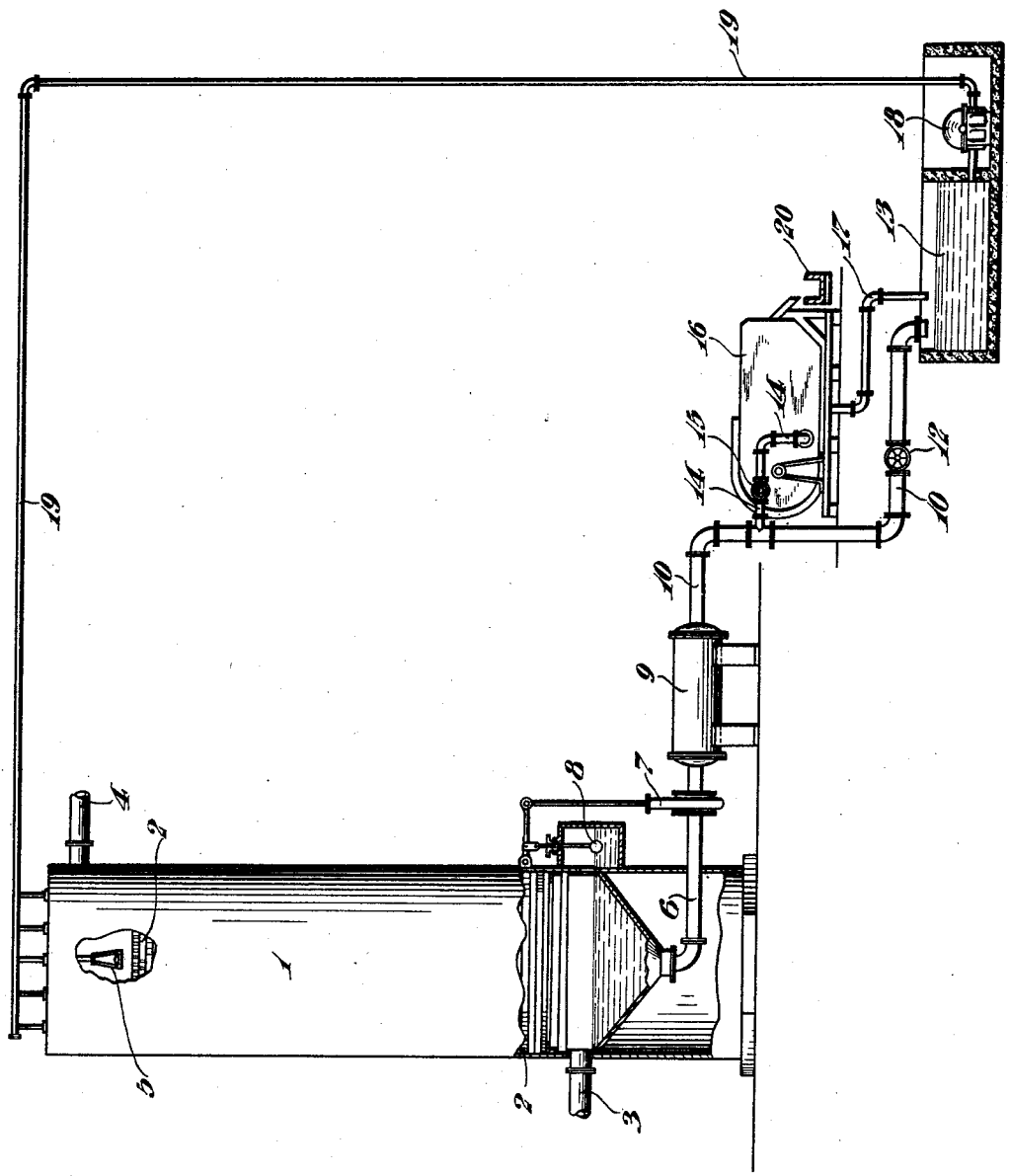
INVENTOR.
Gilbert A. Bragg
BY Jesse R. Langley
ATTORNEY Patented June 16, 1931

1,809,818

UNITED STATES PATENT OFFICE

GILBERT A. BRAGG, OF PITTSBURGH, PENNSYLVANIA, ASSIGNOR TO THE KOPPERS COMPANY, A CORPORATION OF DELAWARE

GAS PURIFICATION PROCESS AND APPARATUS

Application filed December 31, 1927. Serial No. 243,856.

This invention relates to the purification of gas, for example, fuel gas such as coke-oven gas or carburetted water gas, from hydrogen sulphide, hydrogen cyanide and analogous impurities.

Modern gas purification processes involve the recirculation of an absorbent liquid over the gas in an absorption stage wherein impurities are removed from the gas and through an actification stage wherein a regeneration of the absorbent liquid is effected by aerating the fouled absorbent liquid with removal or fixation of the absorbed impurities.

My invention has particular relation to a process of gas purification wherein a solution of an arsenic compound of an alkali-forming element such as sodium or of a thio-derivative of such a compound is employed as absorbent agent. For example, such a liquid may be prepared by dissolving a mixture of arsenous oxide and sodium carbonate in sufficient amount to give a solution containing from 0.7% to 1.0% of arsenic considered as $As_2O_3$ and containing approximately 2 moles of sodium per mole of arsenic. Such a solution gradually becomes sulphided upon contact with the gas and upon aeration there is formed a compound which is usually designated as a soluble thio-arsenate. This compound is an "active" one in the sense that a solution thereof is capable of absorbing further quantities of hydrogen sulphide and of being regenerated by aeration with liberation of absorbed sulphur in elemental form.

In the past, when treating fuel gas such as coke-oven gas containing a normal amount of hydrogen sulphide, for example from about 250 to 350 grains of $H_2S$ per 100 cu. ft., it has been customary to use solutions in such volume and of such strength as would, if completely sulphided and completely actified, be capable of removing about five times as much sulphur from the gas as is actually present therein. The physical problem of obtaining proper contact with the gas for efficient removal of impurities makes this desirable. The actual solution volume and strength, the rate of recirculation and the rate and degree of actification are all inter-related factors, and may vary with the amount of impurities in the gas, the nature of the apparatus, and the like.

For example, assume a situation in which gas containing 350 grains of $H_2S$ per 100 cubic feet is being purified by means of a recirculated and actified solution containing 1.0% of arsenic considered as $As_2O_3$. With a recirculation rate of 150 gallons per thousand cubic feet of gas, the theoretical amount of sulphur which could be removed from the gas, with complete actification of the solution, is 8.5 times the actual amount of sulphur removed. If the recirculation rate drops to 100 gallons per thousand cubic feet of gas and the amount of arsenic to 0.8%, this factor will fall to 4.5, while the factor is 6.3 when the same solution is recirculated at the same rate over gas containing only 250 grains of $H_2S$ per 100 cubic feet.

In order to maintain an equilibrium, it is necessary to liberate an amount of sulphur in the actification stage equivalent to the amount of sulphur removed from the gas as hydrogen sulphide, taking into account losses due to side reactions. Consequently, when proceeding in the manner described hereinabove, that is, with a solution potentially capable of removing five times as much sulphur as is actually required of it, it is only necessary to actify the fouled solution to an extent equivalent to about one-fifth or 20% of the total actification possible, i. e. one-fifth of the actification necessary to change the solution from a completely sulphided state to a completely actified state.

It has been found, however, that under some conditions, this limited actification is not completed in the aeration apparatus and certain operating difficulties may be encountered due to this fact. For example, accumulation of sulphur may occur in the pipe lines leading the actified liquor back to the absorption stage. A possible explanation of this fact is that the liquid leaving the actification stage contains a considerable quantity of entrained air in minute form. As the solution is not completely actified, this entrained air causes further actification to take place.

Apparently the liberation of sulphur is gradual; that is, the sulphur undergoes a more or less gradual change from a state of solution to a state of suspension. The original sulphur particles are liberated in substantially colloidal form and eventually grow until they become too large to be truly colloidal. These colloidal particles tend to attach themselves to any convenient surface and are thus in effect very "sticky". Deposits of sulphur may occur along any surfaces where actification is proceeding.

In the usual gas purification plant, for purposes of flotation of the sulphur and for good reaction, the actual aeration is accomplished either by mechanical beaters, as in a flotation machine, or by the introduction of finely comminuted air through porous diffusion means. While the deposition of sticky sulphur may occur to some extent in the actual actification apparatus, it is more serious in the lines leading from such apparatus to the absorber, for the reason that such lines are not readily cleaned, and tend to clog.

An object of my invention is to provide a process and apparatus whereby more efficient actification of the liquid may be accomplished than has heretofore been possible.

A second object of my invention is to provide a gas purification process and apparatus wherein the deposition of sulphur as hereinabove described may be eliminated.

My invention has for further objects such other operative advantages or results as may hereinafter be found to obtain.

I have found that the difficulties hereinabove recited may be overcome by recirculating the larger portion of the gas purification liquid without actification. In order to maintain the process in equilibrium, a portion of the recirculated liquid is, however, separated or withdrawn and actified to such extent as is necessary under the particular operating conditions. To illustrate how this may be accomplished, let it be assumed that with all of the liquid traversing the actification stage, an actification of 20% of the total actification possible is effected and that this actification is sufficient to maintain the system in equilibrium.

When proceeding according to the process of my invention, however, a certain portion only of the recirculated liquid is actified. If this portion is one-third of the entire recirculated liquid, actification thereof will be carried out to 60% of the total actification possible, while if one-fourth of the entire solution is withdrawn for actification, actification thereof will be carried to 80% of the total actification possible. In this manner, equilibrium conditions are maintained. In other words, since in each case the actual amount of sulphur liberated must remain constant, the extent of the actification will be roughly inversely proportional to the amount of the liquid actified.

This object is readily accomplished by providing means for by-passing the greater portion of the fouled liquid around the actification apparatus. Due to the nature of the usual actification apparatus, the length of time of travel of the liquid through the same is also roughly inversely proportional to the amount of liquid actified and, for this reason, the same equivalent actification occurs within fairly wide limits regardless of the proportions of actified liquid and unactified liquid. In general, I prefer to actify less than half of the total gas purification liquid. With respect to the particular process under consideration, I prefer to actify from approximately one-third to approximately one-fourth of the total fouled solution.

In order that my invention may be clearly set forth and understood, I now describe with reference to the accompanying drawing the preferred manner in which my invention is embodied and performed.

In the drawing, the single figure is a view, partly in elevation and partly in vertical section, of apparatus for gas purification.

The gas to be purified is introduced to an absorber 1, the interior of which is filled with a plurality of any suitable contact media 2, through an inlet pipe 3 and passes upward through the absorber 1 in counter-current with a downwardly flowing stream of absorbent liquid. The purified gas passes out of the absorber 1 through an outlet pipe 4.

The absorbent liquid in this instance comprises a solution containing from 0.7% to 1.0% of arsenic considered as $As_2O_3$ and approximately two moles of soda per mole of arsenic, preferably in the form of a thio-arsenate. The strength of the solution may best be maintained against incidental losses by adding thereto as necessary a mixture of arsenous oxide and sodium carbonate, or a solution thereof.

The absorbent liquid is introduced to the absorber 1 through a plurality of sprays 5 and passes downward through the tower, collecting in the bottom of said tower. The fouled liquid passes from the bottom of the absorber 1 through a conduit 6 having a valve 7 that is conveniently controlled by a float 8 operatively connected therewith in such manner as to maintain a substantially constant level of liquid in the bottom of the absorber 1. This device is illustrated only diagrammatically but its details are not a part of the present invention and will be readily understood by those skilled in the art.

The fouled liquid now traverses a heater 9, wherein it is raised to any desired temperature, for example from about 85° to 105° F., and passes out of said heater 9 through a conduit 10.

The major portion of the fouled liquid passes through conduit 10 and valve 12 into a sump 13. The remaining portion of the solution is withdrawn through a conduit 14 by proper manipulation of valves 12 and 15 and enters the actification apparatus 16.

In the present instance, the actification apparatus comprises a mechanical flotation device, but any other suitable actification apparatus, for example, a pneumatic aeration device, may be substituted at this point. Moreover, a plurality or a combination of such devices may be employed. The actification of the smaller portion of the fouled liquid is conducted to such extent as will maintain equilibrium conditions between the gas being purified and the total absorbent liquid. That is, actification of this lesser portion of the fouled absorbent liquid is carried to such extent as to effect a liberation of an amount of sulphur equivalent to the sulphur removed from the gas as hydrogen sulphide by the total liquid, taking into account any losses that may occur due to side reactions, such as the formation of sodium thiosulphate.

The actified liquid then passes through a conduit 17 into the sump 13, where it mingles with and refreshes the unactified liquid entering the sump through conduit 10. The liquid collecting in the sump 13 is continuously forced by a pump 18 through a conduit 19 and sprays 5 into the interior of the absorber 1, thus completing the cycle. The liberated sulphur separates as a froth upon the surface of the liquid in the actifier 16 and is conveniently removed through a launder 20.

My invention is not limited to the specific example given hereinabove by way of illustration but may be variously embodied and practiced not only in connection with the specific gas purification liquid herein described but any of the other gas purification liquids known to the art, for example, an alkaline suspension of an iron compound.

Moreover, the specific manner in which my invention is carried out may be varied, as, for example, by segregating the more completely actified portion of the liquid and introducing it into the gas in a separate stage than that in which the bulk of the liquid is recirculated.

I have found that the difficulties hereinabove mentioned may be substantially completely eliminated according to the process of my invention, probably by reason of the fact that the sulphur liberated during the actification stage is carried past a colloidal state into a non-colloidal particle size during conditions of agitation of the liquid.

I claim as my invention:

1. A process of purifying a gas from a sulphur impurity which comprises treating the flowing gas with a liquid capable of absorbing said impurity therefrom and of being actified with conversion of said impurity to free sulphur, removing the thereby fouled liquid, recirculating a portion of said liquid over the gas without actification, actifying the remaining portion and recirculating it over the gas.

2. A process of purifying a gas from a sulphur impurity which comprises treating the flowing gas with a liquid capable of absorbing said impurity therefrom and of being actified with conversion of said impurity to free sulphur, removing the thereby fouled liquid, recirculating the major portion of said liquid over the gas without actification, actifying the remaining portion of said liquid, and recirculating it over the gas.

3. In a gas purification process in which an arsenical liquid is recirculated over the flowing gas for the removal of a sulphur impurity therefrom, the step which comprises actifying a portion only of said recirculated liquid.

4. In a gas purification process in which an arsenical liquid is recirculated over flowing gas for the removal of a sulphur impurity therefrom, the step which comprises actifying a portion only of said recirculated liquid to such extent as will maintain substantially constant purification conditions in the entire system.

5. In a cyclic process for purifying a gas from a sulphur impurity and comprising subjecting the gas to contact with a continuously recirculated and regenerated body of liquid capable of absorbing said impurity and of liberating sulphur contained therein in elemental form, the step which comprises effecting the regeneration of the said body of liquid by intensively actifying a portion only of said body during recirculation thereof.

6. Apparatus for purifying a gas from a sulphur impurity comprising, in combination, an absorber for treating gas with an impurity-absorbent liquid, means for recirculating said liquid over said absorber, an aeration device in the path of a portion only of said recirculated liquid, means for removing sulphur liberated in said aeration device, and means for recirculating the remaining portion of the liquid without aeration.

7. Apparatus for purifying a gas from a sulphur impurity comprising, in combination, a single absorber for treating gas with an absorbent liquid, means for recirculating said liquid over said absorber, means for separating a portion of said thereby fouled liquid, an aeration device in the path of said separated portion, means for removing free sulphur liberated in said aeration device, and means for returning said thereby aerated portion to said absorber.

8. Apparatus for purifying a gas from a sulphur impurity which comprises an absorber for treating the gas with an impurity-absorbent liquid, means for withdrawing said liquid from said absorber after contact with the gas, means for aerating a portion only of said withdrawn liquid, means for commingling the thereby aerated portion of said liquid with the remaining portion of the withdrawn liquid, and means for returning the commingled liquid to said absorber for further treatment of gas.

In testimony whereof, I have hereunto subscribed my name this 29th day of December, 1927.

GILBERT A. BRAGG.